H. P. FREAR.
ORE, BULK OR DENSE CARGO CARRIER.
APPLICATION FILED SEPT. 3, 1913.

1,111,740.

Patented Sept. 29, 1914.
6 SHEETS—SHEET 2.

WITNESSES

INVENTOR
Hugo P. Frear,
BY
ATTORNEYS

UNITED STATES PATENT OFFICE.

HUGO P. FREAR, OF SAN FRANCISCO, CALIFORNIA, ASSIGNOR TO BETHLEHEM STEEL CORPORATION, OF SOUTH BETHLEHEM, PENNSYLVANIA, A CORPORATION OF NEW JERSEY.

ORE, BULK OR DENSE CARGO CARRIER.

1,111,740.      Specification of Letters Patent.      Patented Sept. 29, 1914.

Application filed September 3, 1913. Serial No. 787,831.

*To all whom it may concern:*

Be it known that I, HUGO P. FREAR, a citizen of the United States, residing in the city and county of San Francisco, State of California, have invented a new and useful Ore, Bulk or Dense Cargo Carrier, of which the following is a specification.

My invention relates to a novel construction of a vessel for carrying ore, bulk or other cargo, wherein I elevate and locate the cargo hold or central cargo space in substantially the central portion of the vessel with respect to the sides thereof, and locate on each side of said cargo hold, a plurality of tanks or water ballast chambers, while a plurality of tanks or water ballast chambers are also located below said side chambers and central cargo space, said cargo hold and water tanks being collocated and proportioned with respect to each other in a novel manner.

My invention further consists in the novel combination and collocation of the cargo hold or central cargo space, side and bottom water ballast tanks, with a system of piping for filling and emptying said side and bottom tanks, whereby the disposition of the material has the greatest effect, and the hull of the vessel is subjected to minimum stresses and strains, thereby offering increased resistance to the elements and greater safety at sea. Further, by means of the construction above described, any required condition of trim, stability, etc., with any kind or quantity of cargo carried, can be obtained, thereby greatly reducing all the usual stresses and strains, and resulting in a vessel which will have the minimum rolling motion in a sea way, and with the consequent greater sea-worthiness and facility of operation.

My invention further relates to a novel construction of vessel, wherein I am enabled, if desired, to simultaneously transport bulk or other cargoes in the central cargo space or hold or holds, and bulk liquid or other cargoes or stores in the side or lower tanks, it being apparent that by my novel construction, I may, if desired, utilize the entire cargo holds and any portion of the upper and lower compartments or ballast tanks for the transportation of cargoes.

To the above ends, my novel invention consists of a vessel of new and novel design adapted to carry an ore or other dense cargo, of such weight that the quantity necessary to fully load the vessel requires a relatively small percentage of the space obtaining in vessels of ordinary design.

By the employment of my novel invention, I am enabled to elevate and contract the cargo hold to the greatest possible extent, in order to insure the most desirable conditions for (1) loading and discharging; (2) distribution of the cargo; (3) minimizing damage to the hold or central cargo space by falling cargo; (4) an equally desirable metacentric height, or degree of stability with ore or other dense cargoes as if the vessel was designed according to ordinary practice and loaded with a cargo of average density, properly stowed; (5) stowing the cargo in a contracted space and thereby reducing its liability to shift in a sea way; (6) elevating the ore or other dense cargo to bring its center of gravity approximately in the same position as though the hold was of ordinary design and loaded with a cargo of average density properly stowed, thereby reducing the tendency of the vessel to roll to excess in a sea way, and thereby still further reducing the tendency of the cargo to shift; (7) contracting the hold in the manner above described, when carrying ore or other dense cargoes, to the greatest possible extent and fitting the space remaining or any portion of it exclusively for water ballast and with access only through ordinary man-holes so that the space or spaces so exclusively used would be exempted in the measurement for net tonnage; (8) arranging the water ballast tanks so that all or a part of the water ballast can be carried in the top side wing tanks to accomplish similar results so far as stability is concerned, as by elevating the cargo; (9) providing water ballast capacity in excess of cargo hold capacity, (*a*) to secure a minimum gross and net tonnage consistent with the most advantageous stowage of ore or other dense cargo; (*b*) to facilitate distribution of water ballast in such compartments as will give the most desirable stability, draft and trim under every possible service condition.

For the purpose of illustrating my invention, I have shown in the accompanying drawings, one form thereof which is at present preferred by me, since the same will be found in practice to give satisfactory and reliable results, although it is to be understood that the various instrumentalities of which my invention consists can be variously arranged and organized, and that my invention is not limited to the precise arrangement and organization of these instrumentalities as herein shown and described.

Similar numerals of reference indicate corresponding parts in the figures.

Figures 1, 13, 14:
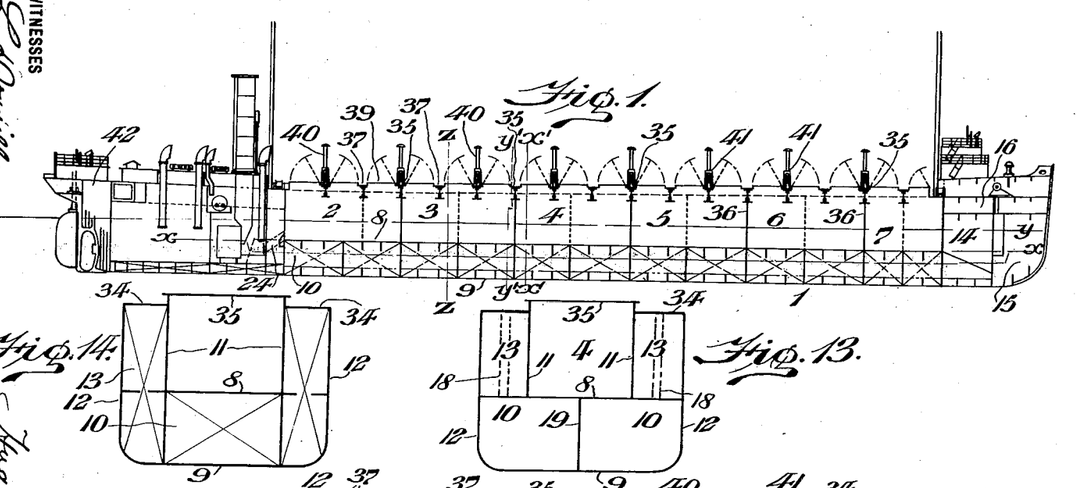
Figure 1 represents a longitudinal, vertical, sectional, diagrammatic view of an ore or other cargo carrying vessel, embodying my invention, the same showing the inboard profile thereof.
Figs. 13 and 14 represent transverse sections showing the relative locations of cargo hold and side and bottom tanks.
Figure 2:
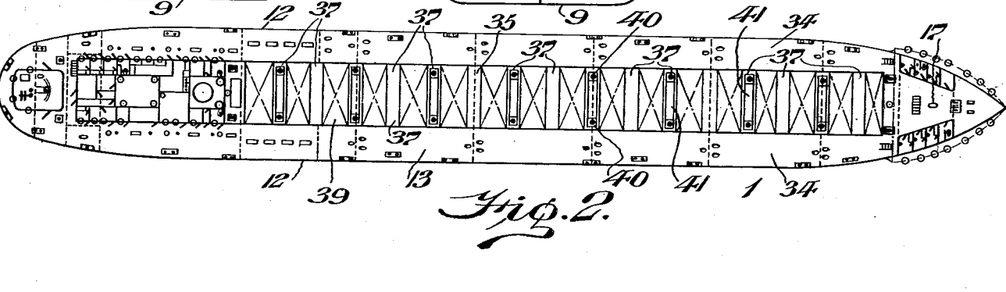
Fig. 2 represents a plan view of Fig. 1, showing the general arrangement of the upper deck and its adjuncts.

Referring to the drawings:—1 designates my novel construction of ore or other cargo carrying vessel, the same being shown in inboard profile in Fig. 1, while the plan of the upper deck will be understood from Fig. 2.

In carrying out my invention, I provide a number of cargo holds, as 2, 3, 4, 5, 6 and 7, which in the present instance are six in number, although the number can be greater or less, as required, or the hold may be fitted with partial bulkheads, so that the hold will be continuous for the full length of the cargo space. These holds are elevated and located in a central position, transversely, of the vessel, and extend longitudinally of the same, as will be understood from Figs. 1, 2 and 3.

8 designates the bottom line of the cargo holds between which and the bottom 9 of the vessel is located a plurality of closed or water-tight lower tanks 10, which may be of any desired number, said tanks extending the full or to any desired length of the cargo holds below the latter, and the side tanks and the space therein being utilized for water ballast, when the vessel is without cargo, or for buoyancy when loaded with cargo.

11 designates the side walls of the cargo holds, between which and the sides 12 of the vessel are located a series or plurality of longitudinally extending closed or water-tight side tanks 13, which extend the full length of the cargo holds fore and aft, or to any desired length with respect thereto. The space in these longitudinally extending side tanks 13 is employed for water ballast when the vessel is not loaded, or for buoyancy when said vessel is loaded with cargo, and these longitudinally extending side tanks 13 in conjunction with the bottom tanks 10 form a complete inner shell of the vessel, and are used for the various conditions and requirements or nature of the cargo to insure proper trim, stability and strength.

Referring to the righthand end of Fig. 1, 14 designates a ballast tank, which is located in the forward end of the vessel, and is separate from and adjacent to the extreme forward ballast tank 15, the water tank 16 being located directly above said ballast tank 14. Referring to the lefthand end of Fig. 1, 42 designates the after peak water ballast trimming tank.

17 designates a man-hole leading to the water ballast tank or tanks 14 or 16.

For the purpose of providing ready and convenient access to the side longitudinal tanks 13, as well as the bottom tanks 10, I provide a series of man-holes which may be of varied construction, according to requirements, and provided with the usual covers. I preferably employ water-tight trunks 18, extending from the upper deck to the lower tank or tanks 10, so that access may be had at all times to said lower tanks 10, even though the side tanks 13 are full of water ballast or liquid cargo, as will be understood from Figs. 3 and 13, any required number of trunks 18 being provided for ready access to said bottom tanks, 10.

One preferred arrangement of the cargo space and side and lower tanks is shown in Fig. 13, in section, and consists of lower tanks, 10, 10, arranged side by side, and upper side tanks 13 located between the sides of the cargo space or holds, and the sides 12 of the vessel. The essential arrangement of the central cargo space or holds and tanks 10 and 13 is such, that the hold or central cargo space is located in the center of the vessel with respect to the sides thereof, and a certain distance above the keel or bottom, with the ballast tanks 13 on each side of said cargo space, and arranged between the sides of said cargo space and the outer shell of the vessel. Between the bottom 8 of the central cargo space or holds and the keel or bottom 9 of the vessel, are located the lower tanks 10, extending the full width of the vessel, with a longitudinal water-tight bulkhead 19 in the center, as will be best understood from Figs. 4 and 13, the object of which is to subdivide the tanks, so that any desired amount or distribution of ballast or liquid or other cargo can be effected.

The arrangement of tanks shown in Fig. 13 provides for four separate and distinct tanks, as 13, 13, 10, and 10, in the cross section of the vessel. This arrangement, however, may be modified in various particulars. I have deemed it unnecessary to show more than one of these modifications, which is shown in Fig. 14, wherein the side ballast tanks 13 extend from the upper deck to the bottom of the vessel, and the lower tank 10 is shown as extending between the bottom of the central cargo space 8 and the keel or bottom 9 of the vessel below the central cargo space and between the longitudinal bulkheads of the side tanks 13. It will be apparent to those skilled in the art, that other variations in the arrangement or collocation of the side and bottom tanks may be employed, without departing from the spirit of my invention.

It will be apparent to those skilled in the art that although the plans and illustrations only show a vessel with one continuous deck for the full length of the vessel, that more than this number can be fitted, without departing from the spirt of my invention.

For the purpose of illustrating my invention, I have shown the ship's structure with the Isherwood (longitudinal) system of framing, but my invention readily lends itself to the transverse system of framing or any other type of construction. The illustrations showing my invention, see Fig. 1, are arranged with the machinery and boilers located in the after part of the vessel. This arrangement, however, can be modified, and the machinery and boilers located in any desired part of the vessel, to suit any requirements. This arrangement may also be modified by dividing the central cargo hold by fitting one or more central ballast tanks.

For the purpose of illustrating one preferred piping system, I have shown an arrangement of a plurality of mains, having branches to each and every compartment, so that I can rapidly fill or empty any of the same with water ballast or any kind of liquid cargo that it may be desired to transport.

Figure 3:
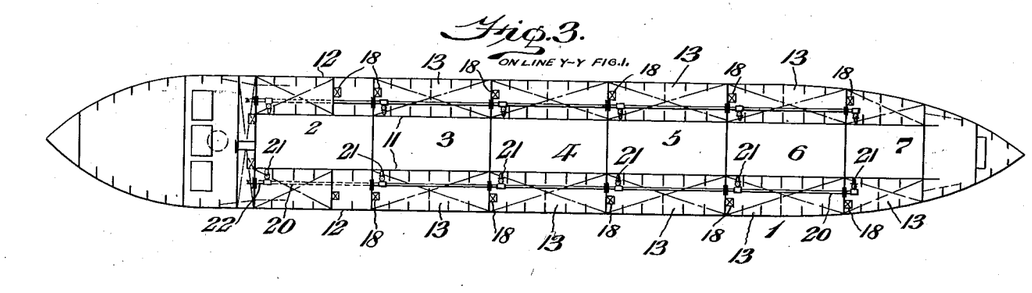
Fig. 3 represents a longitudinal, horizontal, diagrammatic section taken on line $y$—$y$ Fig. 1, showing the top of the double bottom under the cargo hold, and also the side tanks.

In Fig. 3, I have shown one system of piping which may be utilized in conjunction with the side tanks 13, wherein I employ a main line of piping 20, having a section 21 for each of the side tanks 13. It will be apparent that the system of piping employed on both sides of the vessel for said side tanks is substantially the same, and therefore a description of one side will suffice for both. By means of the extension 22, a suitable connection or communication may be had with any desired type of pumping apparatus or other means, for the purpose of filling or emptying the side tanks 13. It will be understood that all the sections 21 are provided with suitable means for controlling the same, from the upper deck or other desired point, such as valves of any desired type, equipped with attachments to enable said valves to be opened or closed from the deck or any other desired location.

Figure 4:
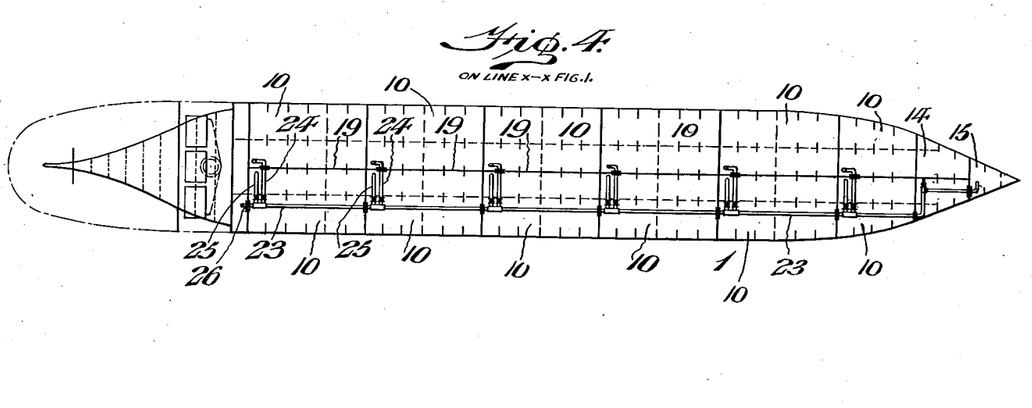
Fig. 4 represents a longitudinal, horizontal section on line $x$—$x$ Fig. 1, showing the general arrangement of the lower water ballast tanks under the cargo holds and side tanks, and the piping therefor.

In Fig. 4, I have shown a preferred method or system of piping, by which the lower tanks 10 and the peak tanks 14 and 15 can be filled or emptied. This consists of a main line of piping 23, having separate sections 24, leading to the lower tanks at one side of the vessel, while separate connections 25 are employed, leading to the tanks on the opposite side, whereby said tanks may be filled or emptied, according to requirements, a suitable connection or communication being had through the pipe or extension 26 to any suitable pumping apparatus, or other means, for filling and emptying the same. One preferred location of the connections 22 and 26 is shown in Figs. 3 and 4, but this arrangement can be altered to suit any requirements of cargo ballast or location of pumping machinery.

The construction of vessel hereinabove described is especially favorable for the carriage of heavy bulk cargoes, but readily adaptable to the carriage of cargoes of other natures, by arranging the sizes and locations of the cargo spaces or holds and side and lower tanks to suit the individual requirements. This type of ship provides various means of arranging cargo spaces, so that the greatest speed and facility in loading, trimming and discharging can be attained. The design further provides a construction by which bulk or other cargoes can be carried in the central cargo space, and bulk liquid or other cargoes or stores in the side and lower tanks.

Figures 1, 7:
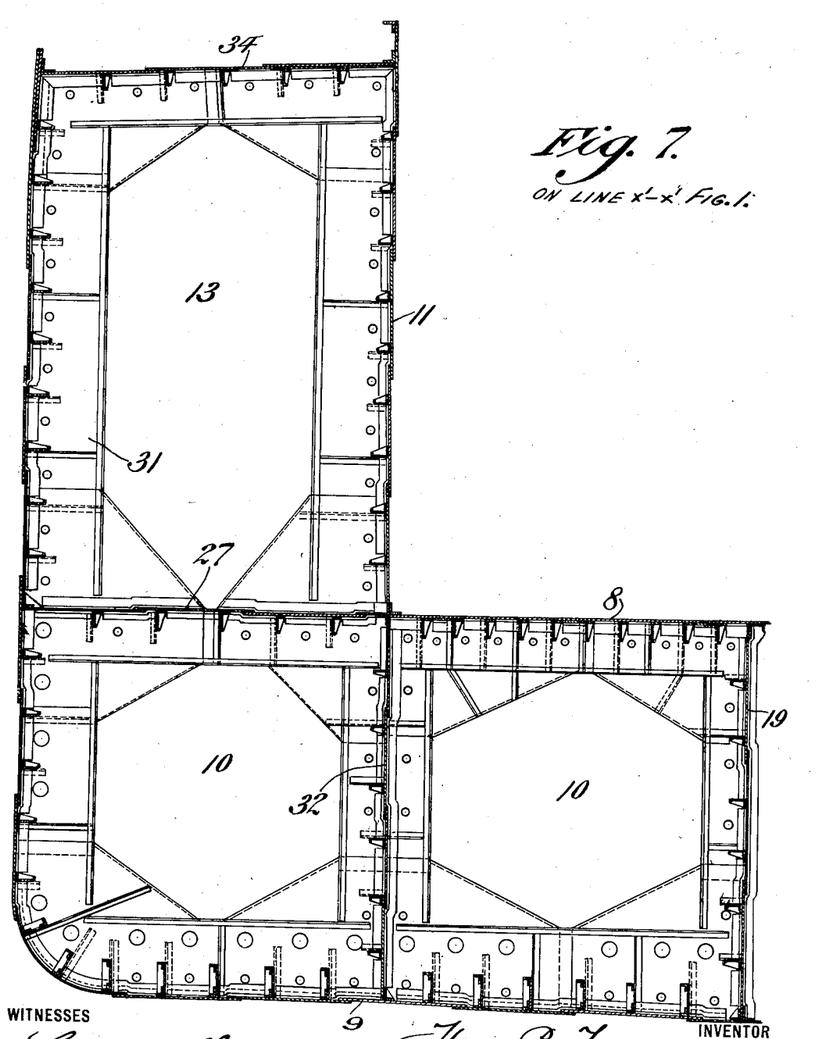
Fig. 7 represents a section on line $x'$—$x'$, Fig. 1.
Figure 5:
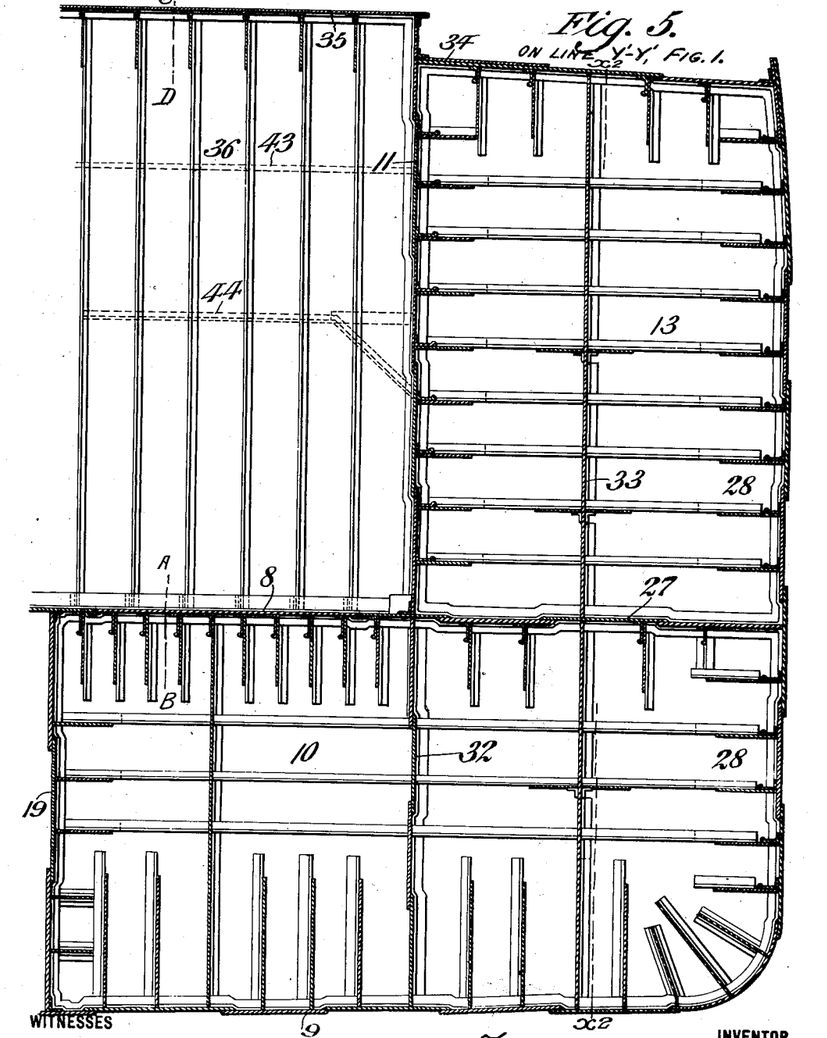
Fig. 5 represents, on an enlarged scale, a vertical, transverse, sectional view on line $y'$—$y'$, Fig. 1, showing the internal construction of the side and bottom water ballast tanks, and transverse bulkheads in the cargo hold.
Figure 6:
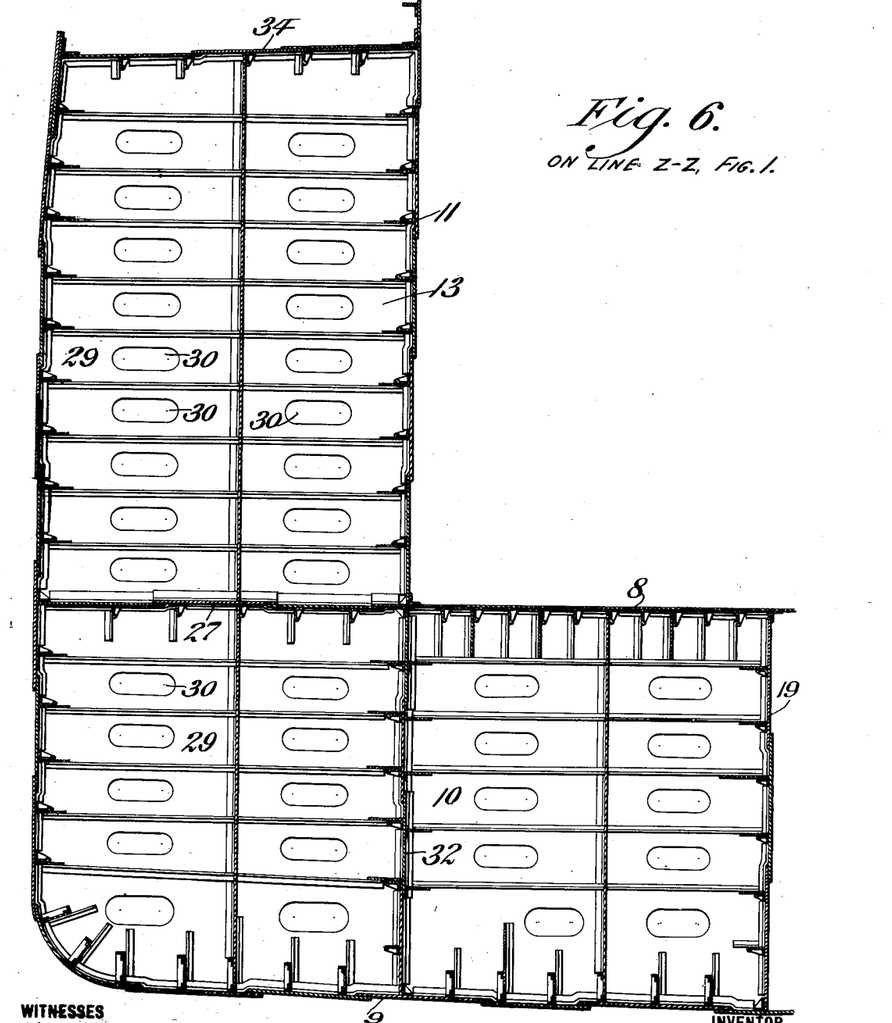
Fig. 6 represents, on an enlarged scale, a sectional view on line $z$—$z$ Fig. 1, showing the section at a side of a swash bulkhead.

Figs. 5, 6 and 7 illustrate in transverse sections, the various structural details of the vessel, the scantlings and other details of which may be arranged to suit the various requirements. In the construction seen in Fig. 5, it will be evident that the side water tank 13 seen therein is a separate compartment from the lower water tank 10, being divided therefrom by means of water-tight divisional plates or deck 27, as will be understood from Figs. 5, 6 and 7. The side tanks 13 are closed at each end by means of water-tight bulkheads 28, see Fig. 5. In an intermediate position between these water-tight bulkheads 28, is located a swash bulkhead 29, see Fig. 6, if the length of tank necessitates such construction, said bulkhead having openings 30 therein, through which water or the liquid cargo can flow from end to end of the tank. In intermediate positions, as arranged between the swash bulkhead 29, see Fig. 6, and the water-tight bulkheads 28, see Fig. 5, transverse web frames 31 are arranged as required, to suit the length of the tank, or construction of the vessel, as will be readily understood from Fig. 7. It will be understood that the construction and location of water-tight bulkheads, swash bulkheads, and transverse web frames for the lower tanks 10 will correspond in a general way with the description given above for the side tanks 13. Again referring to Figs. 5, 6 and 7, it will be seen that the lower ballast or liquid cargo tanks 10 are provided with a longitudinally arranged swash bulkhead 32, extending in an intermediate position between the center line bulkhead and side of vessel, from end to end of said lower tanks 10. This bulkhead 32 is provided with suitable openings, so that each part of the tank on each side of the center line bulkhead 19 is in communication. In Fig. 5, I have shown, in dotted lines, at 43 and 44, a construction of a partial transverse bulkhead, in the cargo holds, by which the lower portion of the bulkhead is dispensed with, so that the holds, 2, 3, 4, 5, 6 and 7 may be continuous, if desired.

Figures 8, 9, 10, 11, 12:
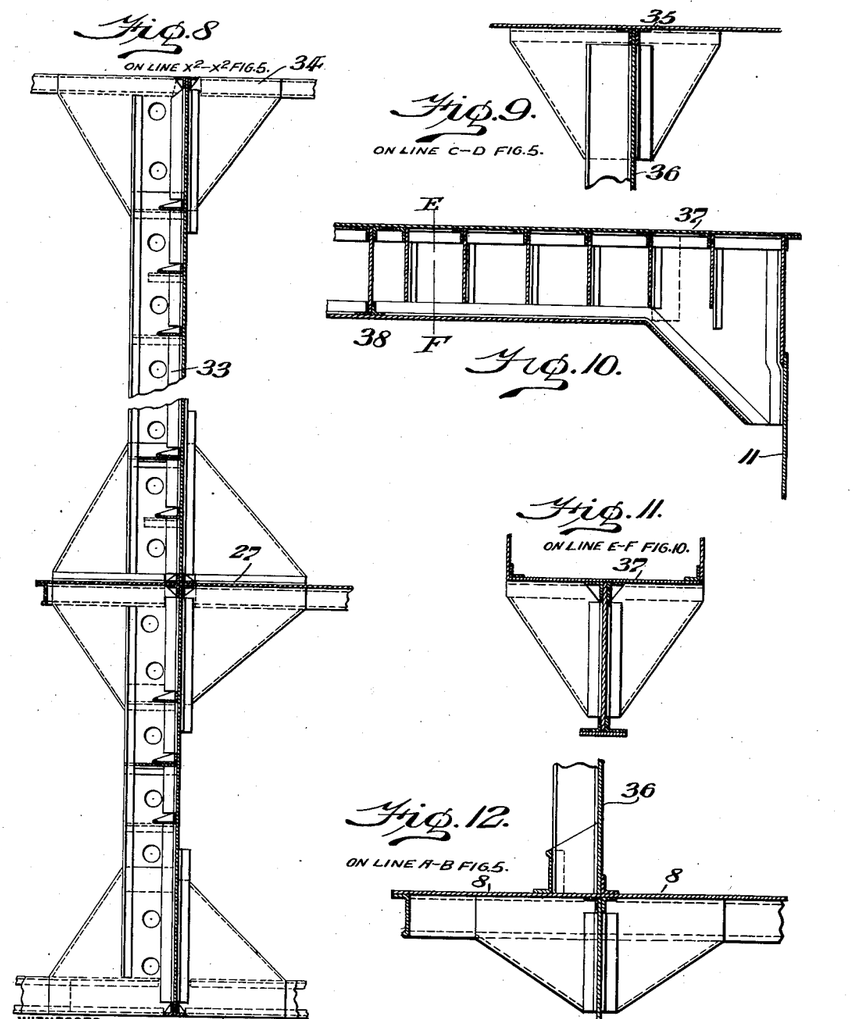
Fig. 8 represents a section on line $x^2$—$x^2$, Fig. 5.
Fig. 9 represents a section on line C—D, Fig. 5.
Fig. 10 represents a sectional detail of the strongback, located between the hatches except where bulkheads are shown.
Fig. 11 represents a section on line E—F Fig. 10.
Fig. 12 represents a section on line A—B, Fig. 5.

In Fig. 8, I have shown a detail construction of the vertical stiffening 33 on the transverse bulkheads 28 of the ballast or liquid cargo tanks 10 and 13, the same extending from the upper deck 34 to the bottom 9 of the vessel or steamer.

The details of the scantlings and construction of the vessel will of necessity be in accordance with the size of the vessel, and the requirements of the various countries in which the vessels are constructed or operated, and the requirements of the classification societies with which they are classed, and therefore do not require any further detailed explanation.

The arrangement of the hatches 39, derrick posts 40, platforms 41, etc., shown in Figs. 1 and 2 is the arrangement I prefer for an ore carrying steamer engaged in a particular service, but this general arrangement and the details thereof can be modified and altered, so as to conform with any desired requirements for various kinds of cargo and conditions and equipment for loading and discharging. Figs. 1 and 2 show details of construction of said hatches, derrick posts and platforms, which I preferably employ in the present instance, but it will be understood that these details may be modified to suit the various requirements, and I therefore deem it unnecessary to describe the same more minutely.

Fig. 9 shows a method of connecting the upper portion of the transverse bulkheads 36 of the central cargo space with the plating 35 over the top of said central cargo space between the hatches.

Figs. 1, 2, 10 and 11 illustrate the location and construction of the strong backs 38, across the top of the central cargo space under the plating 37 between the cargo hatches, Fig. 10 illustrating a view taken transversely of the vessel, showing the construction, and Fig. 11 showing a section taken longitudinally of the vessel on line E—F, Fig. 10, showing the construction and method of attachment of the strong back, the details of construction of the strong backs 38 being governed by the size of the vessel.

It will furthermore be apparent that while I have illustrated my invention as applied to a vessel fitted with boilers and engines, the broad principle of my invention can be equally well applied to vessels or hulls, with or without any type of propelling machinery or other means of propulsion.

It will be seen from the foregoing that my novel design of vessel is especially adapted to carry ore or other cargoes, so dense that only a small percentage of the space usually assigned for cargo is required for stowage. It will be apparent from the foregoing that I attain a distinct advantage over prior devices, since—

(a) I elevate the bottom of the cargo hold above the height usually employed, (the same being an integral part of the main structure of the hull) so that the center of gravity of the ore or other dense cargo would be approximately at the same height as the center of gravity of a cargo of average or lesser density properly stowed in a ship's hold designed according to common practice.

(b) I make the bottom or floor of the hold water-tight for the full width of the hold and preferably extend it across the full width of the vessel. I also subdivide the space below the cargo hold, as above described, by transverse divisions or bulkheads into water-tight compartments. I also preferably further subdivide the space by fitting a longitudinal center line water-tight bulkhead. The compartments are consequently fitted either exclusively for water ballast or in whole or in part for carrying any kind of liquid cargo or stores, when the vessel's hold, as above described, is not loaded with its designed cargo, or when it is loaded with cargo of different or average density. It is obvious that it is optional whether the space below the cargo hold, as above described, is further subdivided by additional longitudinal bulkheads, and these additional bulkheads may or may not be water-tight.

(c) In order to facilitate loading and discharging the ore or other dense cargo, and in order to reduce the width of the hold, as above described, thereby permitting the ore or other dense cargo to be loaded to a greater depth, and being distributed over a greater length of the vessel, and to better safeguard against the cargo shifting transversely in a sea way, and in order to permit a sufficient quantity of water ballast to be carried above the level of the floor of the main cargo hold, as above described, to secure a desirable metacentric height when the vessel is in ballast or partly loaded, a longitudinal water-tight bulkhead is fitted on each side of the hold, preferably extending the full length of the hold and preferably extending to the deck at the top of the said cargo hold, as above described. In lieu of extending these longitudinal bulkheads to the deck at the top of the cargo hold, they may extend up any distance above the floor of the said hold, to the inner edge of a stringer or flat extending outboard to the ship's side plating. The space thus formed between the above longitudinal bulkheads and the ship's side plating and between the level of the said cargo hold and deck or stringer, as the case may be, is subdivided by transverse divisions or bulkheads. The compartments into which the above wing spaces are divided may be fitted exclusively for water ballast or in whole or in part, for the use of any kind of liquid cargo or stores or coal, when the vessel's hold, as above described, is, or is not, loaded, or is partly loaded with its designed cargo, or when it is loaded with a cargo of different or average density.

(d) The arrangement and combined capacity of the ballast tanks located below the level of the bottom of the hold, together with the wing ballast tanks situated above the level of the bottom of the hold, and between the longitudinal bulkheads and ship's side plating, as above described, preferably have capacity for more water ballast than would be required or could be carried in any service condition, the advantage being that the ballast can be distributed in the upper or lower compartments to secure the most desirable draft, trim and stability in all possible service conditions, and at the same time exempting as much space as possible from the net tonnage measurement.

(e) By reducing the transverse sectional area of the cargo hold or central cargo space by elevating the bottom, and still further by reducing its width in the manner above described, the gross and net tonnage is reduced to a minimum consistent with the best possible stowage of the ore or other dense cargo.

(f) It will be apparent that it is immaterial whether the ore or other dense cargo hold is subdivided by transverse bulkheads or by partial bulkheads, where the propelling machinery is fitted aft, or if the hold is divided by fitting the propelling machinery in whole or in part, amidships. The number, size and character of the hatches is also immaterial. It is also immaterial whether the design or construction of the vessel, forward or aft of the cargo holds, is special, or according to common practice. It is also immaterial what arrangements are made for loading and discharging cargo or handling fuel or ballast. These may be on the vessel or on shore. It is also immaterial whether the vessel is self-propelled or towed, or, if self-propelled, whether coal or liquid fuel is used, or whether or not the vessel carries passengers.

It will now be apparent that I have devised a novel and useful construction of an ore, bulk or dense cargo carrier, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. A vessel of the character described, comprising an outer main shell, a longitudinally extending cargo hold arranged centrally within the main outer shell with its bottom wall elevated a substantial distance from the bottom wall of the main shell, closed side tanks arranged between the cargo hold and the side walls of the main shells and adapted for the reception of a liquid ballast or liquid cargo, and closed lower tanks arranged between the bottom of the cargo hold and the bottom of the main outer shell and extending completely across the bottom of the cargo hold, said lower tanks being divided by a central closed bulkhead and having open communication to said side shells, and the combined capacity of said side tanks and lower tanks being greater than the capacity of said cargo hold, and means for introducing and withdrawing liquid ballast into each of the lower closed tanks.

2. A vessel of the character described, comprising a main outer shell, a longitudinally extending cargo hold located in the central portion of the main outer shell with its bottom wall spaced a substantial distance from the bottom wall of the main outer shell, closed tanks arranged between the side walls of the main outer shell and cargo hold and extending for a substantial distance above the bottom wall of the cargo hold, lower closed tanks arranged between the bottom wall of the cargo hold and the bottom wall of the main outer shell extending entirely across the bottom of the cargo hold and the bottom of the closed side tanks, means for supplying a ballast liquid into each of the lower tanks, said lower tanks being divided by a central closed bulkhead and having open communication to the side shells, and trunks extending substantially vertically through the side tanks into the lower tanks for affording access to the latter.

3. In a vessel of the character described, an elevated longitudinally extending cargo hold, centrally located with respect to the sides of said vessel, a plurality of closed, water-tight side tanks adapted for water ballast or liquid or other cargo, located on each side of said cargo hold, a plurality of lower, closed, water-tight tanks adapted for water ballast or liquid cargo, extending longitudinally of said vessel under said side water tanks and cargo hold, said side and lower tanks being separated from each other, and peak tanks 14, 15 and 16 located in the forward part of the vessel, said tank 14 being located in juxtaposition to the forward end of said cargo hold, said tank 16 being located above said tank 14, and said tank 15 being forward of the tank 14.

4. A vessel of the character described, comprising a main outer shell, a longitudinally extending cargo hold located in the central portion of said main outer shell, with its bottom wall spaced a substantial distance from the bottom wall of said main outer shell, closed tanks arranged between the side walls of the main outer shell and cargo hold and extending for a substantial distance above the bottom wall of the cargo chamber, lower closed tanks arranged between the bottom wall of the cargo chamber and the bottom wall of the main outer shell extending entirely across the bottom of said cargo hold and the bottom of the closed side tanks, and means for independently or simultaneously introducing a ballast liquid or liquid cargo into each of said lower tanks, said lower tanks being divided by a central closed bulkhead and having open communication to the side tanks, the bottom of said cargo hold being elevated above the keel to a height in excess of the usual proportions or depth with respect to the depth of the vessel, and the width of said side tanks being so proportioned with respect to the width of said cargo hold, that cargoes of any density will have approximately the same metacentric height as cargoes of lesser or average density in ships of ordinary construction, the combined capacity of said side tanks and lower tanks being greater than the capacity of said cargo hold.

5. A vessel of the character described, comprising a main outer shell, a longitudinally extending cargo hold located in the central portion of said main outer shell, with its bottom wall spaced a substantial distance from the bottom wall of the main outer shell, closed tanks arranged between the side walls of said main outer shell and cargo hold and extending for a substantial distance above the bottom wall of said cargo hold, lower closed tanks arranged between the bottom wall of said cargo hold and the bottom wall of the main outer shell, extending entirely across the bottom of said cargo hold, said lower tanks being adapted to receive a liquid ballast or a liquid cargo, and being divided by a central closed bulkhead and having open communication to the side shells, and trunks extending downwardly from the deck of the vessel through said side tanks into the lower tanks for affording access to said lower tanks under the cargo hold, the bottom of said cargo hold being elevated above the keel to a height in excess of the usual proportions or depth with respect to the depth of the vessel, and the width of the said side tanks being so proportioned with respect to the width of the cargo hold that with cargoes of heavy density, the vessel will have approximately the same metacentric height as with ordinary cargoes of lesser or average density in ships of ordinary construction.

6. A vessel of the character described, comprising a main outer shell, a longitudinally extending cargo hold located in the central portion of said main outer shell, with its bottom wall spaced a substantial distance from the bottom wall of the main outer shell, closed tanks arranged between the side walls of the main outer shell and cargo hold and extending for a substantial distance above the bottom wall of said cargo hold, lower closed tanks arranged between the bottom wall of said cargo hold and the bottom wall of the main outer shell extending entirely across the bottom of said cargo hold, said lower tanks being adapted to receive a liquid ballast or a liquid cargo and being divided by a central closed bulkhead and having open communication to said side shells, and trunks extending downwardly from the deck of the vessel through said side tanks into said lower tanks for affording access to said lower tanks under the cargo hold, the bottom of said cargo hold being elevated above the keel to a height in excess of the usual proportions or depth with respect to the depth of the vessel, and the width of the said side tanks being so proportioned with respect to the width of the vessel that with cargoes of heavy density the vessel will have approximately the same metacentric height as with ordinary cargoes of lesser or average density in ships of ordinary construction, the combined capacity of said side tanks and said lower tanks arranged under said cargo hold being greater than the capacity of said cargo hold.

7. A vessel of the character described, comprising a main outer shell, a longitudinally extending cargo hold located in the central portion of said main outer shell, with its bottom wall spaced a substantial distance from the bottom wall of said main outer shell, tanks arranged between the side walls of the main outer shell and cargo hold and extending for a substantial distance above the bottom wall of said cargo chamber, and lower closed tanks arranged between the bottom wall of the cargo chamber and the bottom wall of the main outer shell and extending entirely across the bottom of said cargo hold, said tanks being adapted to contain a ballast liquid or liquid cargo, said lower tanks being divided by a central closed bulkhead and having open communication to the side shells, the bottom of said cargo hold being elevated above the keel to a height in excess of the usual proportions or depth with respect to the depth of the vessel, and the width of said side tanks being so proportioned with respect to the width of said cargo hold, that cargoes of any density will have approximately the same metacentric height as cargoes of lesser or varied density in ships of ordinary construction, the combined capacity of said side tanks and lower tanks being greater than the capacity of said cargo hold.

HUGO P. FREAR.

Witnesses:
    Jos. J. Tynan,
    F. J. Trist.